United States Patent [19]

Numasaki et al.

[11] 4,120,644

[45] Oct. 17, 1978

[54] APPARATUS FOR REGENERATION OF SPENT ACTIVE CARBON

[75] Inventors: Kouichi Numasaki; Yoshihisa Sakai, both of Yokohama; Takehiko Nawa, Yokosuka; Zenji Matsumoto, Izumi; Nobutaka Ninomiya, Nagaokakyo, all of Japan

[73] Assignees: JGC Corporation, Tokyo; Takeda Chemical Industries, Ltd., Osaka, both of Japan

[21] Appl. No.: 780,790

[22] Filed: Mar. 23, 1977

[30] Foreign Application Priority Data

Mar. 31, 1976 [JP] Japan ................... 51-35862

[51] Int. Cl.² .................. F27B 15/10; B01J 8/12
[52] U.S. Cl. .................. 432/99; 432/102; 34/168; 252/418; 201/34
[58] Field of Search .......... 432/14, 17, 18, 31, 432/58, 95–102; 34/86, 167, 168, 171; 201/34, 38; 202/418, 420, 445; 252/418, 420, 445; 23/277 R

[56] References Cited

U.S. PATENT DOCUMENTS

| 685,336 | 10/1901 | Leroy et al. | 34/171 |
|---|---|---|---|
| 3,033,545 | 5/1962 | Azbe | 432/99 |
| 3,544,096 | 12/1970 | Buchner | 432/99 |
| 4,007,014 | 2/1977 | Matsumoto et al. | 432/95 |
| 4,007,093 | 2/1977 | Doilov et al. | 202/122 |
| 4,008,994 | 2/1977 | Numasaki et al. | 432/14 |

FOREIGN PATENT DOCUMENTS

| 45-6,697 | 3/1970 | Japan | 432/99 |
|---|---|---|---|
| 1,118,354 | 7/1968 | United Kingdom | 432/18 |
| 1,259,603 | 1/1972 | United Kingdom | 432/14 |

*Primary Examiner*—Henry C. Yuen
*Attorney, Agent, or Firm*—Blanchard, Flynn, Thiel, Boutell & Tanis

[57] ABSTRACT

The present invention provides a double-cylinder type apparatus for the regeneration of active carbon, which comprises a heating furnace provided with at least one burner and at least one annular regeneration chamber composed of at least one set of an inner cylinder and an outer cylinder installed concentrically inside said heating furnace, said outer cylinder having a plurality of holes penetrating the side wall thereof, wherein the spent active carbon is supplied to the upper part of said annular regeneration chamber and the regenerated carbon is to be taken out at the lower part of the same. The heating of said annular regeneration chamber from the side of said inner cylinder is performed either by introducing the flue gas arising in said heating furnace into the inner cylinder or by providing at least one burner within said inner cylinder and utilizing the combustion gas from said burner. The spent active carbon can be regenerated by subjecting the same to the process comprising drying, calcination and reactivation by the use of the flue gas.

9 Claims, 6 Drawing Figures

APPARATUS FOR REGENERATION OF SPENT ACTIVE CARBON

BACKGROUND OF THE INVENTION

The present invention relates to an apparatus for the regeneration of the active carbon used in waste water treatment and so forth.

Some of the present inventors have previously proposed a regeneration apparatus for spent carbon, which facilitates the mixing of spent active carbon and provides a satisfactory regeneration effect (cf. Japanese Patent Application No. 7484/1973 corresponding to U.S. Pat. No. 4,007,014; U.S. Ser. No. 575,597, now U.S. Pat. No. 4,008,994). This previously proposed apparatus is devised such that in the center of a vertical heating furnace provided with at least one burner, a regeneration gas supply system and a duct with a damper, there is inserted an outer cylinder having a feed inlet for the spent active carbon disposed at the upper end thereof and a device for discharging the resulting product disposed at the lower end thereof. An inner cylinder sealed at the lower end thereof and having a regeneration gas supply system and a duct with a damper is inserted in said outer cylinder concentrically therewith. A multiplicity of inclined annular plates with a slope steeper than the angle of repose of the spent active carbon are provided in vertically multi-stage fashion on both the inner periphery of said outer cylinder and the outer periphery of said inner cylinder by vertically staggering the inclined annular plates of the outer cylinder relative to the inclined annular plates of the inner cylinder. A plurality of penetrating holes are bored in both the wall of said outer cylinder and the wall of said inner cylinder.

In a regeneration apparatus devised as above, the spent active carbon is fed through the top of the annular regeneration chamber composed of the outer cylinder and the inner cylinder, and is subjected to indirect heating with the flue gas from the heating furnace mainly through the outer cylinder wall. Meanwhile, the regeneration gas such as steam, etc. flows in the annular regeneration chamber mainly through the holes penetrating the inner cylinder wall, and the spent active carbon comes in contact with the regeneration gas in this chamber and is subjected to the drying, calcination and reactivation processes, in that order, as it descends from the top to the bottom inside the regeneration chamber, thereby to be generated as product.

This double-cylinder type regeneration apparatus designed to heat through the outer cylinder is suitable for a small-size apparatus, but it is not always suitable for a large-scale operation employing a large-size apparatus. That is, according to this type of apparatus, there is a limit to the enlargement of the clearance of said annular regeneration chamber (to wit, the interspace between the outer and the inner cylinders) for the purpose of securing the necessary heat transfer to the spent active carbon within the annular regeneration chamber. Besides, inasmuch as the central passage within the inner cylinder does not take part in the heat transfer, in order to enhance the regeneration efficiency of the apparatus, the diameter of the inner and the outer cylinders must be enlarged while the clearance of the annular regeneration chamber is kept within limits, and accordingly, it is necessary to enlarge the diameter of the heating furnace. Consequently, the cost of construction of the apparatus and the operation expenses per unit amount of disposal of spent active carbon are affected thereby, and therefore this apparatus is rather disadvantageous from an industrial point of view.

SUMMARY OF THE INVENTION

A principal object of the present invention is to provide a double-cylinder type regeneration apparatus for spent active carbon, which can eliminate the foregoing defects in the prior art and is economical and superb in thermal efficiency.

Another object of the present invention is to render it possible to enlarge the clearance of the regeneration chamber compared with the conventional regeneration apparatuses and to improve the thermal efficiency of the apparatus as a whole.

A further object of the present invention is to provide a large-size regeneration apparatus for spent active carbon, which achieves reduction of the cost of construction of the apparatus as well as the fuel consumption per unit amount of disposal of spent active carbon.

The present invention provides a double-cylinder type regeneration apparatus for spent active carbon, which apparatus comprises a heating furnace with at least one burner and an annular regeneration chamber provided within said heating furnace and composed of an inner cylinder and an outer cylinder having a plurality of holes bored in its wall, said two cylinders being concentrically disposed within said heating furnace, and is devised to feed the spent active carbon to the upper part of said annular regeneration chamber and take out the product from the lower part of the same, wherein the heating of the annular regeneration chamber is effected from both the side of the inner cylinder and the side of the outer cylinder. As the means for heating from the side of the inner cylinder, interconnected ducts can be provided on the lower part of the inner and the outer cylinders so as to introduce the flue gas from the outer cylinder side into the inner cylinder side, or at least one burner can be installed within the inner cylinder, or both of these techniques can be jointly used, etc., and it may be selected according to need.

Hereunder will be explained the mode of practicing the present invention with reference to the appended drawings.

Figure 1:
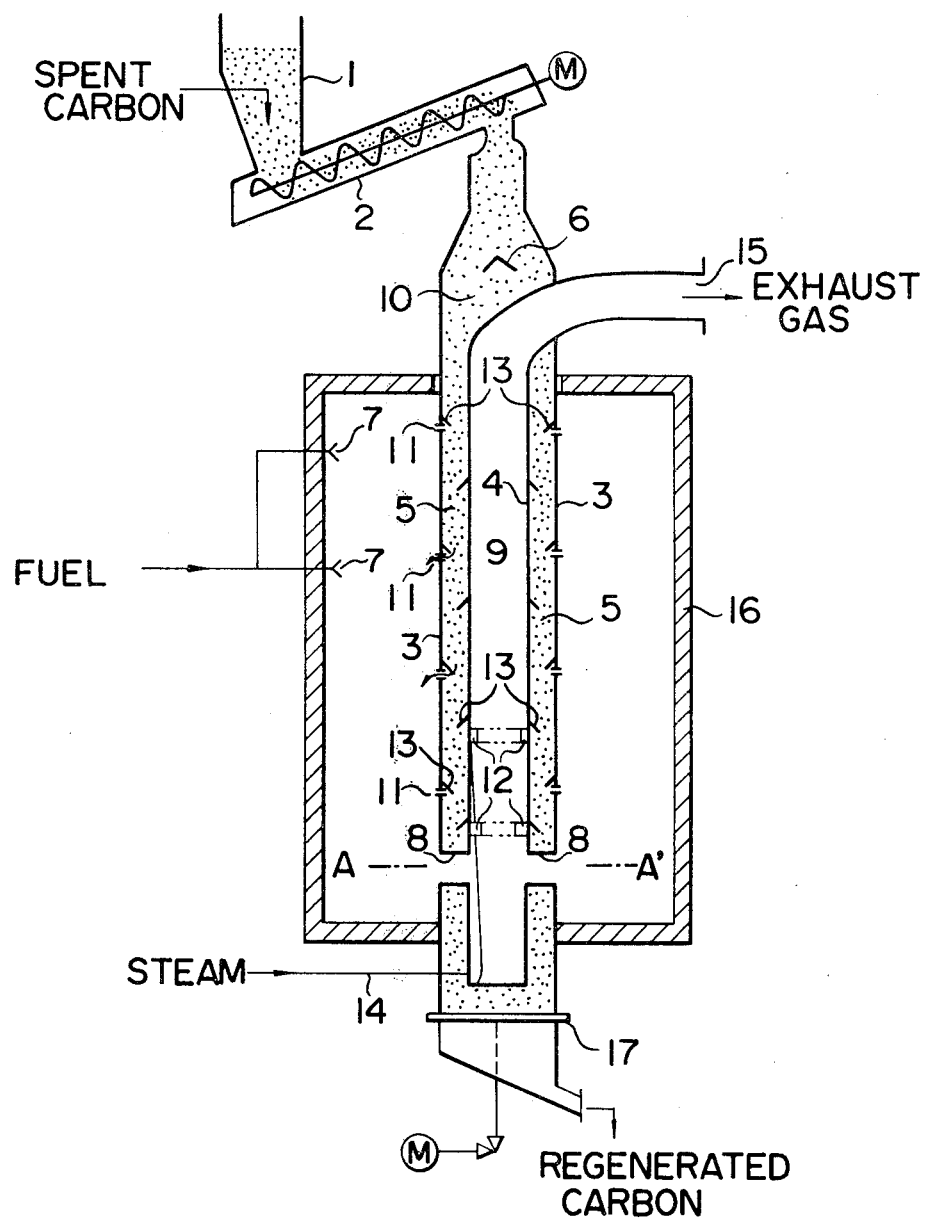
FIG. 1 is a longitudinal sectional view of an embodiment of an apparatus according to the present invention.
Figure 2:
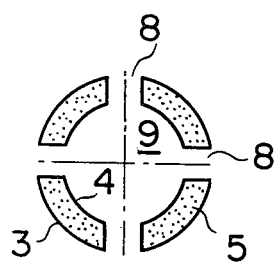
FIG. 2 is a transverse sectional view taken along the line A-A' in FIG. 1, FIG. 3 and FIG. 4 illustrate the details of the regeneration gas intake and the fin-installing portion, respectively, in the annular regeneration chamber.
Figure 3:
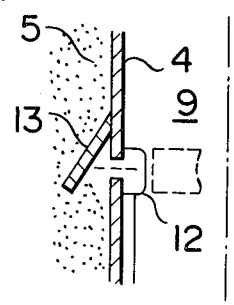
Figure 4:
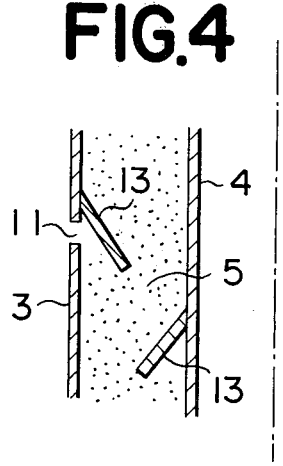
Figure 6:
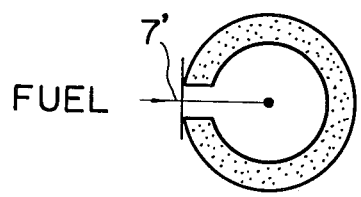
FIG. 6 is a transverse sectional view taken along the line B-B' in FIG. 5.

The apparatus in FIG. 1 exemplifies the mode wherein the flue gas is introduced into the inner cylinder by means of ducts which are interconnected with the furnace. According to this apparatus, the spent active carbon is fed from the hopper 1, is conveyed by the screw feeder 2 to be distributed into the annular regeneration chamber 5 formed the outer cylinder 3 and the inner cylinder 4 (hereinafter simply called 'regeneration chamber') by means of the distributor 6 installed in the upper part of the regeneration chamber 5, moves downwardly through the regeneration chamber by the force of gravity and arrives at the bottom of the regeneration chamber 5. While thus descending, the spent active carbon is subjected to the drying, calcination and reactivation processes. Meanwhile, the regeneration chamber 5 is heated from the side of the outer cylinder 3 by means of the flue gas from the burner 7 of the heating furnace 16 and is simultaneously heated from the side of inner cylinder 4 too by means of the flue gas which is generated in the heating furnace 16 and introduced into the central chamber within the inner cylinder 4 by way of the interconnected ducts 8 devised to introduce said flue gas into the inner cylinder 4. The interconnected ducts 8 are normally positioned in the lower part of the inner and the outer cylinders and usually consist of two to four ducts, although the selection of the number of ducts depends on the amount of flue gas to be introduced into the inner cylinder, the diameter of the ducts, etc., and they are preferably arranged symmetrically for the sake of effecting uniform heating of the regeneration chamber (cf. FIG. 2). The outer cylinder 3 forming the regeneration chamber 5 is provided with a multiplicity of penetrating holes 11, and at several places in the lower part of the inner cylinder 4 there are provided the gas supply inlets 12 for supplying the regeneration gas, e.g., steam (cf. FIG. 3). The regeneration gas is steam, carbon dioxide or flue gas. Further, the interior of the outer cylinder 3 and the exterior of the inner cylinder 4 are respectively provided with the annular plates 13 inclined downwardly (cf. FIG. 4). These downwardly inclined annular plates 13 are for the purpose of facilitating the mixing and contact of the descending spent active carbon with the regeneration gas, but omission thereof will cause no particular inconvenience. Besides, elongation of the inner cylinder 4 up to a position suitable for effecting heat exchange with the spent active carbon supplied to the upper part 10 of the regeneration chamber 5 will contribute to enhancement of the thermal efficiency.

Now, when the spent active carbon descends within the regeneration chamber 5, it is heated from the outer cylinder side as well as from the inner cylinder side and further brought into contact with the regeneration gas introduced into the regeneration chamber 5 from the gas supply inlets 12 through the pipe 14, whereby the spent active carbon releases the adsorbed substances. The vaporized adsorbed substances flow out into the heating furnace 16 through the penetrating holes 11 and burn upon contacting with a high-temperature combustion gas within the furnace. Said flue gas heats the regeneration chamber 5 from the outer cylinder side as it circulates within the furnace, and a part of the flue gas passes through the interconnected ducts 8 and is introduced into the chamber 9 within the inner cylinder 4. Perfect combustion of a portion of the vaporized adsorbed substances which has been left unburned is conducted herein, and the resulting flue gas is discharged to the outside of the system through the outlet 15 for flue gas after effecting heat exchange with the spent active carbon within the regeneration chamber 5. Meanwhile, the regenerated active carbon that has fallen onto the bottom of the regeneration chamber 5 is taken out of the furnace by means of a table feeder type exhaust device 17.

In the above described apparatus, it is ideal to construct the inner cylinder and the outer cylinder composing the regeneration chamber and the interconnected ducts 8 by employing a heat-resisting material having a good heat-conductivity, and as the regeneration gas, steam, carbon dioxide, and flue gas are generally employed.

Figure 5:
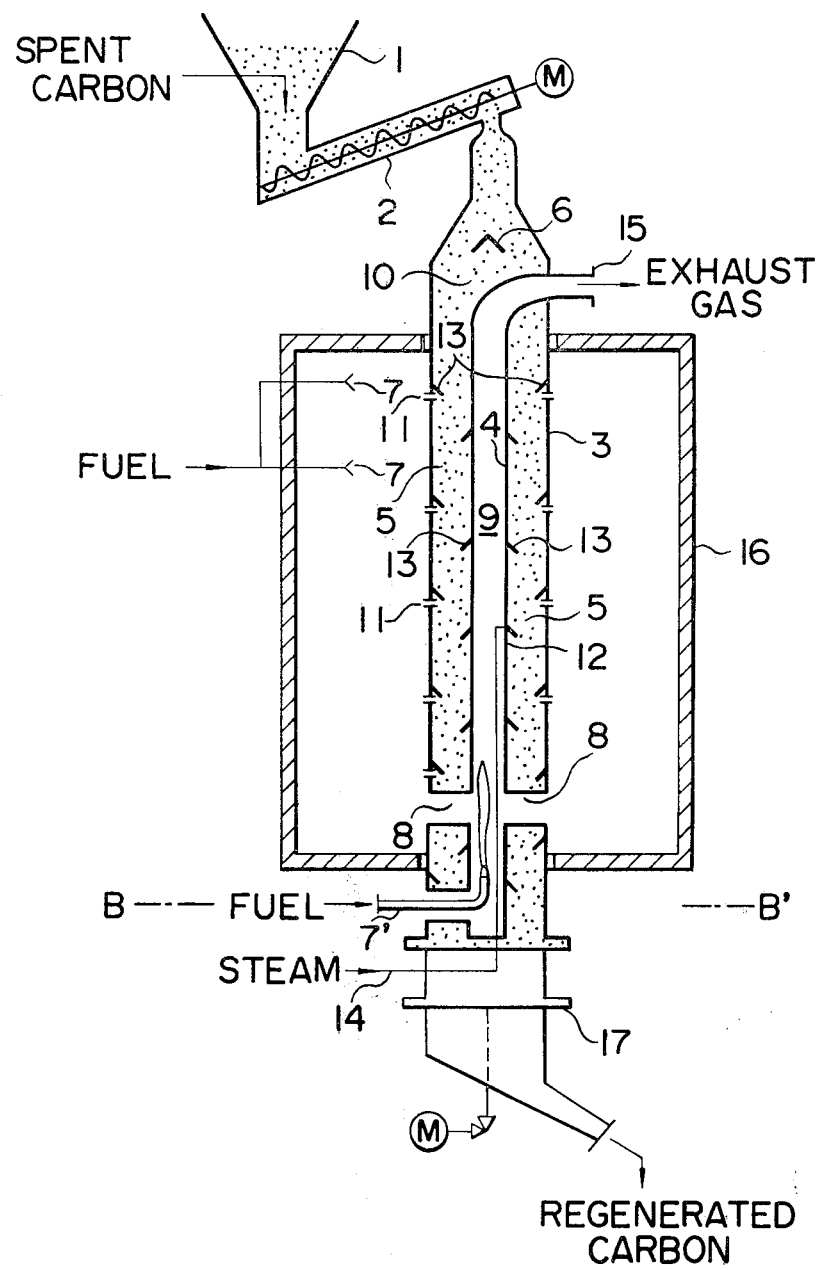
FIG. 5 is a longitudinal sectional view of another example of the apparatus according to the present invention.

FIG. 5 illustrates an example wherein interconnected ducts 8 are provided and further a burner 7' is installed within the inner cylinder 4. This burner 7' is desirably disposed centrally in the lower part of the chamber of the inner cylinder. In this case, the air for combustion pertaining to said burner serves concurrently for the cooling of the regenerated active carbon.

Further, though not shown in the drawing, an apparatus of the same design as illustrated in FIG. 5 except for omission of said additional duct 8 is also one embodiment of the present invention.

As will be understood from the foregoing descriptions, what characterizes the present invention is that the annular regeneration chamber is designed to be heated from both the inner cylinder side and the outer cylinder side so as to enlarge the heat transfer area, whereby the thickness of the regeneration chamber can be enhanced compared with the conventional apparatuses and a remarkable improvement of the thermal efficiency of the apparatus as a whole can be achieved successfully. Consequently, particularly in the case of a large-sized apparatus, the present invention renders it possible to reduce the cost of construction and the fuel expenses per unit amount of disposal of the spent active carbon.

DESCRIPTION OF THE PREFERRED EMBODIMENTS

Examples 1 – 3.

| Example No. | 1. Apparatus designed to heat regeneration chamber from both sides by using interconnected ducts (FIG. 1) | 2. Apparatus designed to heat inner and outer faces of regeneration chamber with the aid of burner disposed in the void of inner cylinder | 3. Apparatus designed to heat inner and outer faces of regeneration chamber with the aid of interconnected duct and burner disposed in the void of inner cylinder (FIG. 5) | Comparative Example: double-cylinder type apparatus designed to heat regeneration chamber from one side |
|---|---|---|---|---|
| maximum capacity (Ton/day) | 3.0 | 3.1 | 3.5 | 1.5 |
| essential dimentions of apparatus | $2500\phi \times 4200H$ | $2500\phi \times 7000H$ | $2700\phi \times 8000H$ | $2400\phi \times 4500H$ |
| cost of regeneration ($\underline{Y}$Kg-Ac)* | 90 | 70 | 60 | 140 |
| (ratio) | (65) | (50) | (43) | (100) |
| clearance of regeneration chamber (mm) | 115 | 120 | 110 | 80 |
| fuel (Kcal/Kg-Ac) | 5000 | 5500 | 4800 | 8000 |

-continued

| Example No. | | 1. Apparatus designed to heat regeneration chamber from both sides by using interconnected ducts (FIG. 1) | 2. Apparatus designed to heat inner and outer faces of regeneration chamber with the aid of burner disposed in the void of inner cylinder | 3. Apparatus designed to heat inner and outer faces of regeneration chamber with the aid of interconnected duct and burner disposed in the void of inner cylinder (FIG. 5) | Comparative Example: double-cylinder type apparatus designed to heat regeneration chamber from one side |
|---|---|---|---|---|---|
| Utilities consumption | steam (Kg/Kg-Ac) | 0.2 | 0.2 | 0.2 | 0.2 |
| | electric power (KWH/Kg-Ac) | 0.11 | 0.08 | 0.10 | 0.12 |
| | supplementary carbon (%) | 3 | 3 | 3 | 3 |

*¥ means Japanese yen.

What is claimed is:

1. A double-cylinder type apparatus for regeneration of spent active carbon, which comprises a heating furnace provided with at least one burner and at least one annular regeneration chamber composed of an inner cylinder and an outer cylinder installed concentrically inside said heating furnace and extending from the top of said furnace to the bottom of said furnace and arranged so that the heated gas from said burner contacts said outer cylinder to heat same, said outer cylinder having a plurality of holes penetrating the side wall thereof, said outer cylinder being constructed so that spent active carbon can be fed into the upper part of said annular regeneration chamber and the regenerated active carbon can be removed from the lower part of said regeneration chamber, and means from heating the annular regeneration chamber from both the inner cylinder side and the outer cylinder side thereof, including ducts extending from the lower part of said inner cylinder through said regeneration chamber and said outer cylinder and communicating with said heating furnace so that the combustion gas within said heating furnace is introduced into the inner cylinder, whereby the combustion gas is effective to heat said annular regeneration chamber from both the inner cylinder side and the outer cylinder side thereof.

2. An apparatus according to claim 1, wherein at least one burner is provided within said inner cylinder.

3. An apparatus according to claim 1, wherein said ducts consist of from two to four ducts which are disposed symmetrically.

4. An apparatus according to claim 1, wherein at least one burner is provided within said inner cylinder.

5. An apparatus according to claim 1, wherein said inner cylinder has holes therethrough communicating with said regeneration chamber, and inlets for supplying regeneration gas to said holes in said inner cylinder, said inlets being disposed at several places adjacent to the lower part of said annular regeneration chamber.

6. An apparatus according to claim 1, wherein said outer cylinder and said inner cylinder forming said annular regeneration chamber are respectively provided with a multiplicity of annular plates which are installed on the interior of the outer cylinder and the exterior of the inner cylinder in a downwardly inclined fashion.

7. An apparatus for regenerating spent active carbon, comprising a heating furnace having a side wall and upper and lower walls, said furnace having at least one burner for burning a fuel thereby to generate a heated gas in said furnace;

a pair of vertical, concentric, radially spaced, inner and outer cylinder disposed in said heating furnace and spaced from the side wall of said furnace and defining an upright, elongated, annular, regeneration chamber between said cylinders, said inner and outer cylinders each penetrating through both the upper wall and the lower wall of said furnace, said inner and outer cylinders both having a multiplicity of openings through the walls thereof and communicating with said regeneration chamber;

an exhaust duct extending from the upper end of said inner cylinder for discharging heated gas therefrom, the lower end of said inner cylinder being closed;

means for feeding spent active carbon to the upper end of said regeneration chamber and means for removing regenerated active carbon from the lower end of said regeneration chamber;

means for supplying regeneration gas to said openings in said inner cylinder so that the regeneration gas flows through the openings in said inner cylinder into said regeneration chamber to contact the spent carbon falling downwardly therein and then said regeneration gas flows outwardly through the openings in said outer cylinder in said furnace:

means for supplying an upwardly flowing stream of heated gas, separate from said regeneration gas, into the lower end of said inner cylinder so that said stream of heated gas flows upwardly through said inner cylinder and thence outwardly therefrom through said exhaust duct, whereby the spent carbon falling downwardly in said regeneration chamber is heated by heat transferred through the walls of both said inner and outer cylinders and is contacted by said regeneration gas so that the absorbed substances in said spent carbon are gasified and flow out through the openings in said outer cylinder into said furnace and are burned thereon;

said means for supplying an upwardly flowing stream of heated gas into the lower end of said inner cylinder comprises duct means having open ends and imperforate sidewalls, said duct means extending between and through the walls of said inner and outer cylinders close to the lower wall of the furnace so that the heated gas from said furnace flows into the lower end of said inner cylinder and thence upwardly therein.

8. An apparatus according to claim 7 in which said means for supplying an upwardly flowing stream of heated gas into the lower end of said inner cylinder comprises burner means separate from said burner for said furnace, said burner means communicating with the lower end of said inner cylinder so that the heated gas from said burner means flows into said lower end of said inner cylinder.

9. An apparatus according to claim 7, in which said means for supplying regeneration gas comprises conduit means extending through said inner cylinder and connected to gas supply inlets communicating with said openings in said inner cylinder.

* * * * *

UNITED STATES PATENT AND TRADEMARK OFFICE
CERTIFICATE OF CORRECTION

PATENT NO. : 4 120 644

DATED : October 17, 1978

INVENTOR(S) : Kouichi Numasaki et al

It is certified that error appears in the above-identified patent and that said Letters Patent are hereby corrected as shown below:

Column 5, line 29; change "from" to ---for---.

Column 6, line 33; change "in" (second occurrence) to ---into---.

Column 6, line 46; change "thereon" to ---therein---.

Signed and Sealed this

Sixth Day of February 1979

[SEAL]

Attest:

RUTH C. MASON
*Attesting Officer*

DONALD W. BANNER
*Commissioner of Patents and Trademarks*